United States Patent [19]

Poirier et al.

[11] Patent Number: 5,025,881
[45] Date of Patent: Jun. 25, 1991

[54] VEHICLE TRACTION CONTROL SYSTEM WITH FUEL CONTROL

[75] Inventors: David C. Poirier, Troy; Mark T. Matheny, Canton; George C. Mitchell, Ypsilanti; Steven J. Swantick, Novi; Gerald J. Wroblewski, Plymouth; Douglas W. Menck, Otsego; Robert C. Simon, Jr., Novi, all of Mich.

[73] Assignee: General Motors Corporation, Detroit, Mich.

[21] Appl. No.: 385,322

[22] Filed: Jul. 25, 1989

[51] Int. Cl.$^5$ .................. B60K 28/16; F02D 17/04
[52] U.S. Cl. .................... 180/197; 123/332; 123/481
[58] Field of Search ............... 180/197; 123/198 DB, 123/332–335, 478, 481

[56] References Cited

U.S. PATENT DOCUMENTS

| | | | |
|---|---|---|---|
| 3,756,205 | 9/1973 | Frost | 123/32 EA |
| 4,432,430 | 2/1984 | Lind et al. | 180/197 |
| 4,545,455 | 10/1985 | Kanemura et al. | 180/197 |
| 4,596,164 | 6/1986 | Hasegawa et al. | 123/478 |
| 4,598,679 | 7/1986 | Ohkumo et al. | 123/333 X |
| 4,637,487 | 1/1987 | Nakamura et al. | 180/197 |
| 4,674,458 | 6/1987 | Mori | 123/333 |
| 4,721,176 | 1/1988 | Kabasin et al. | 180/197 |

Primary Examiner—Charles A. Marmor
Assistant Examiner—Alan M. Kagen
Attorney, Agent, or Firm—Howard N. Conkey

[57] ABSTRACT

In a method of traction control, fuel injectors are selectively disabled to unfuel respective cylinders of an engine to reduce engine torque output. The method provides for limiting the number of cylinders that can be disabled for acceleration spin control based on engine and vehicle operating parameters to improve traction control performance and provide protection for the vehicle catalytic converter.

4 Claims, 4 Drawing Sheets

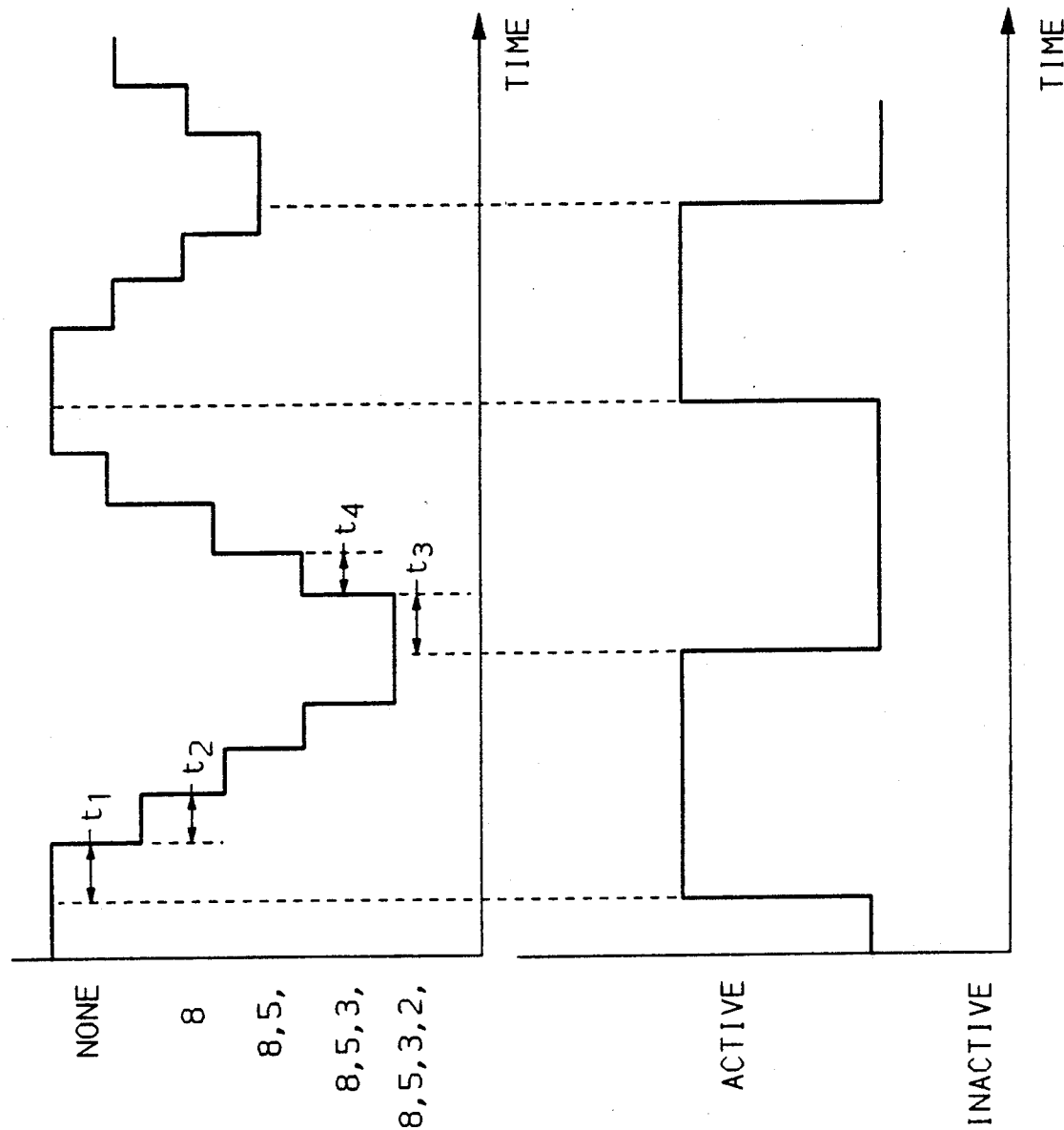

VEHICLE TRACTION CONTROL SYSTEM WITH FUEL CONTROL

BACKGROUND OF THE INVENTION

This invention relates to a vehicle traction control system and, more particularly, to such a system that includes limiting wheel spin by withholding fuel from selected cylinders of the engine by disabling selected fuel injectors in a port injected internal combustion engine.

Various methods have been proposed for preventing an excessive spinning condition of the driven wheels of a vehicle during vehicle acceleration when the operator initiated engine torque delivered to the vehicle driven wheels are such that the frictional forces between the tire and the road surface are overcome. These methods include the adjustment of engine torque and/or the application of the brakes of the driven wheels when an excessive acceleration spinning condition is detected. One method of adjusting engine torque output for limiting wheel spin during vehicle acceleration controls the individual injectors in a port injected internal combustion engine so as to selectively withhold fuel from selected cylinders. In this form of system, the cylinders to which fuel is withheld intake only air during their intake strokes and do not contribute to the torque output of the engine. The number of cylinders to which fuel is withheld determines the amount of reduction in the engine torque output.

In limiting wheel spin, the number of cylinders disabled through the withholding of fuel is a function of the torque reduction required before there is recovery from the excessive spin condition which in turn is a function of operator input, road surface condition, etc. It is not desireable, however to allow the number of cylinders disabled to limit wheel spin to increase unconstrained. Unlimited disabling of cylinders may result in undesireable traction control system performance and may give rise to elevated temperatures of a catalytic converter typically employed in vehicle exhaust systems.

SUMMARY OF THE INVENTION

The present invention is directed to a method of limiting the number of cylinders that can be disabled for acceleration spin control independent of the driven wheel spin condition. In general, the invention provides for limiting the number of cylinders that can be disabled for acceleration spin control based on engine and vehicle operating parameters to improve traction control performance, provide protection for the catalytic converter and assure a pleasing feel in vehicle operation to the vehicle operator.

In one aspect of the invention, the maximum number of unfueled cylinders for traction control is established as a function of vehicle speed.

In another aspect of the invention, the maximum number of fueled cylinders for traction control is established as a function of engine coolant temperature.

In yet another aspect of the invention, the number of unfueled cylinders is decreased as a function of the closing rate of the throttle regulating the air flow into the engine.

DESCRIPTION OF THE DRAWINGS

The invention may be best understood by reference to the following description of a preferred embodiment and the drawings in which:

FIGS. 3A and 3B are diagrams illustrating the selective disabling of the cylinders of the internal combustion engine of FIG. 1 for traction control.

Referring to FIG. 1, the present invention is described as applied to a vehicle 8-cylinder internal combustion engine 10 in which each cylinder is provided fuel via a respective one of 8 fuel injectors INJ1–INJ8. This form of fuel delivery system is commonly referred to as a port fuel injection system. Air is drawn into the intake manifold of the engine 10 via an intake throttle bore having an operator controlled throttle therein for regulating air flow into the engine 10. Air and the fuel provided by an injector for a cylinder are drawn into the cylinder and undergo combustion to develop driving torque delivered to the driven wheels of the vehicle. The combustion gases from the cylinder are then discharged into an exhaust conduit 14 which includes a conventional three-way catalytic converter 16 and then to the atmosphere. As is well known, the catalytic converter 16 functions to simultaneously convert carbon monoxide, hydrocarbons and nitrogen oxides and thereby reduce emission of those components into the atmosphere.

Figure 1:
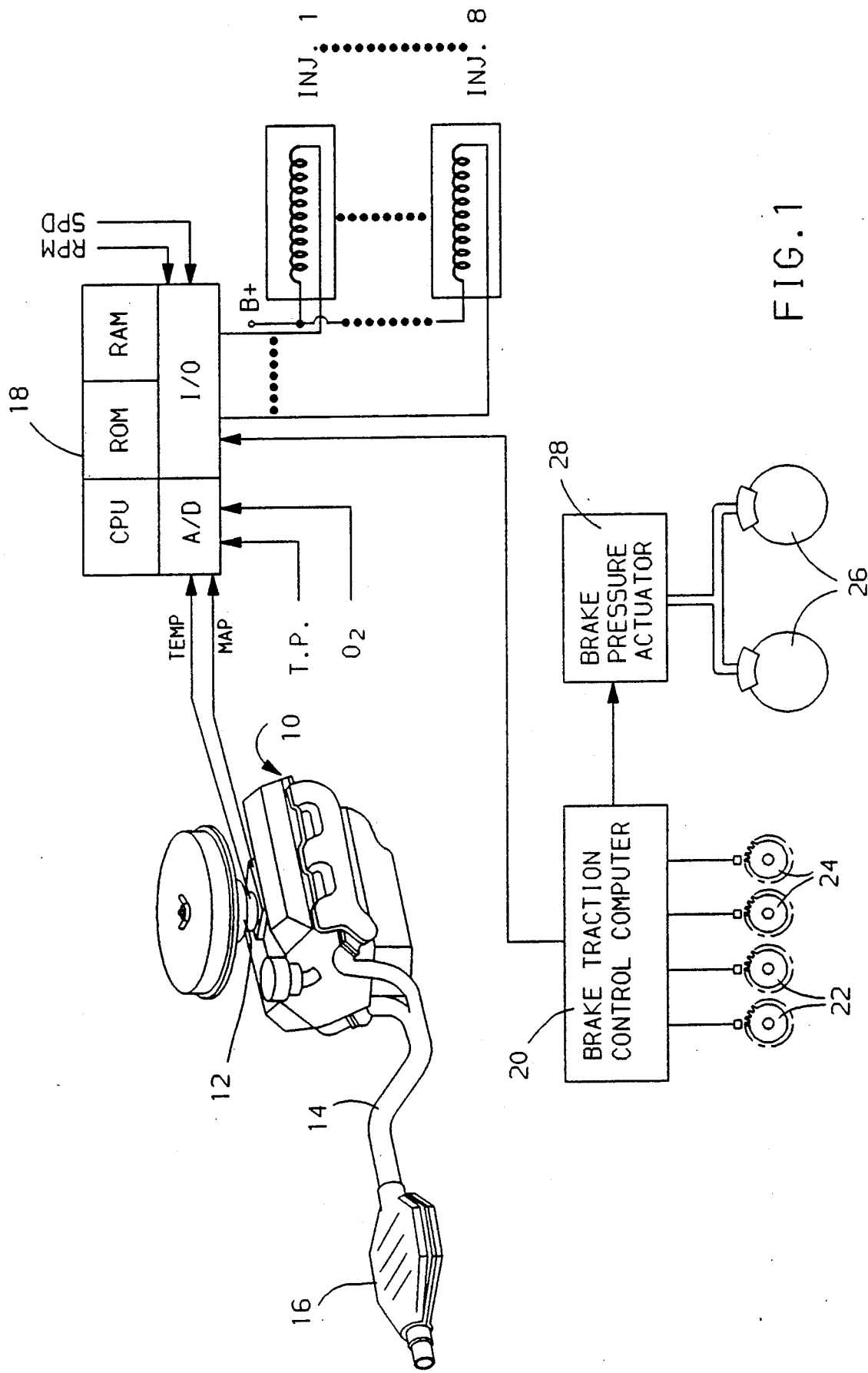
FIG. 1 illustrates the general form of a traction control system for a vehicle port fuel injected internal combustion engine.

The engine 10 is controlled by a conventional digital controller 18. Included in this control is the conventional control of the individual fuel injectors INJ1–INJ8 for injecting fuel to each of the respective cylinders of the engine 10 in timed relation to engine rotation. In general, the injectors are controlled in response to various engine and vehicle operating parameters to achieve a scheduled air/fuel ratio. These parameters may include engine coolant temperature TEMP, manifold absolute pressure MAP, throttle position TP, engine speed RPM, vehicle speed SPD and the output $O_2$ of an exhaust oxygen sensor each being provided by a conventional transducer. While not illustrated, the controller 18 also controls in conventional manner other engine and vehicle systems including ignition spark timing, vehicle transmission, etc.

The digital controller 18 takes the form of a conventional general purpose digital computer programmed to perform the various control functions including the control of the fuel injectors INJ1–INJ8 for establishing a desired air/fuel ratio and for limiting the engine torque output for traction control in accord with the principles of this invention and as will hereinafter be described. The digital controller 18 is comprised of a read-only memory ROM, a random access memory RAM, an analog-to-digital converter A/D for converting the various analog signals to digital signals, and an input/output section I/O which receives discrete signal inputs and provides discrete signal control outputs such as to the fuel injectors INJ1–INJ8. In general, under control of the program stored in the ROM, the digital controller 18 executes various routines at timed intervals for acoomplishing the various control functions.

To provide for the limiting of acceleration spin of the driven wheels of the vehicle for traction control, the preferred embodiment of the invention controls both the brakes of the driven wheels and the engine torque output. The control of the driven wheel brakes is provided by a conventional brake traction control system that includes a brake traction control computer 20 that responds to the speeds of the vehicle driven wheels via speed sensors 22 and the speeds of the undriven wheels provided by wheel speed sensors 24. The brake traction control computer actuates the driven wheel brakes 26 via a brake pressure actuator 28 to limit wheel spin when the speeds of the respective wheel speed sensors 22 and 24 represent an excessive acceleration spin condition in response to the application of excessive torque to the driven wheels via the internal combustion engine 10.

The brake traction control computer 20 may take any conventional form including a purpose digital computer such as the digital controller 18. The brake pressure actuator 28 may also take any conventional form and may include, for example, a DC torque motor responding to a signal output of the traction control computer 20 for controlling a piston establishing a controlled hydraulic pressure in the wheel brakes 26.

While operation of the driven wheel brakes 26 may operate to limit wheel spin, it is undesirable to continuously apply large amounts of braking pressure to the driven wheels. For example, long periods of brake application for limiting wheel spin during conditions of high engine torque output may result in the brakes heating to unacceptable levels. In order to prevent this condition, the engine torque output is limited when traction control is required to limit wheel spin by selectively disabling the injection of fuel to one or more cylinders of the internal combustion engine 10. By withholding fuel from a cylinder, the cylinder intakes only air and does not operate to generate torque for driving the driven wheels. The air drawn into the cylinder is discharged into the exhaust conduit 14 on the exhaust stroke. It therefore follows that the greater the number of cylinders from which fuel is withheld, the greater the reduction of the output torque of the engine.

In general, the brake traction control computer 20 provides a traction control active signal to the digital controller 18 indicating that wheel slip is being limited by actuation of the brakes 26 in response to a sensed excessive spin condition. The controller 18 then one-by-one disables the injection of fuel to selected cylinders in ramp fashion until a selected maximum number of cylinders such as four are disabled or until the brake control computer terminates the traction control active signal in response to a sensed recovery from the excessive spin condition. Upon termination of the traction control active signal from the brake traction control computer 20 indicating a recovery from the excessive spin condition, the disabled cylinders are sequentially enabled one-by-one. In accord with this invention, the number of cylinders disabled is limited even if the traction control active signal is active to ensure satisfactory operation and performance of the vehicle, the traction control system and the catalytic converter.

Figure 2A:
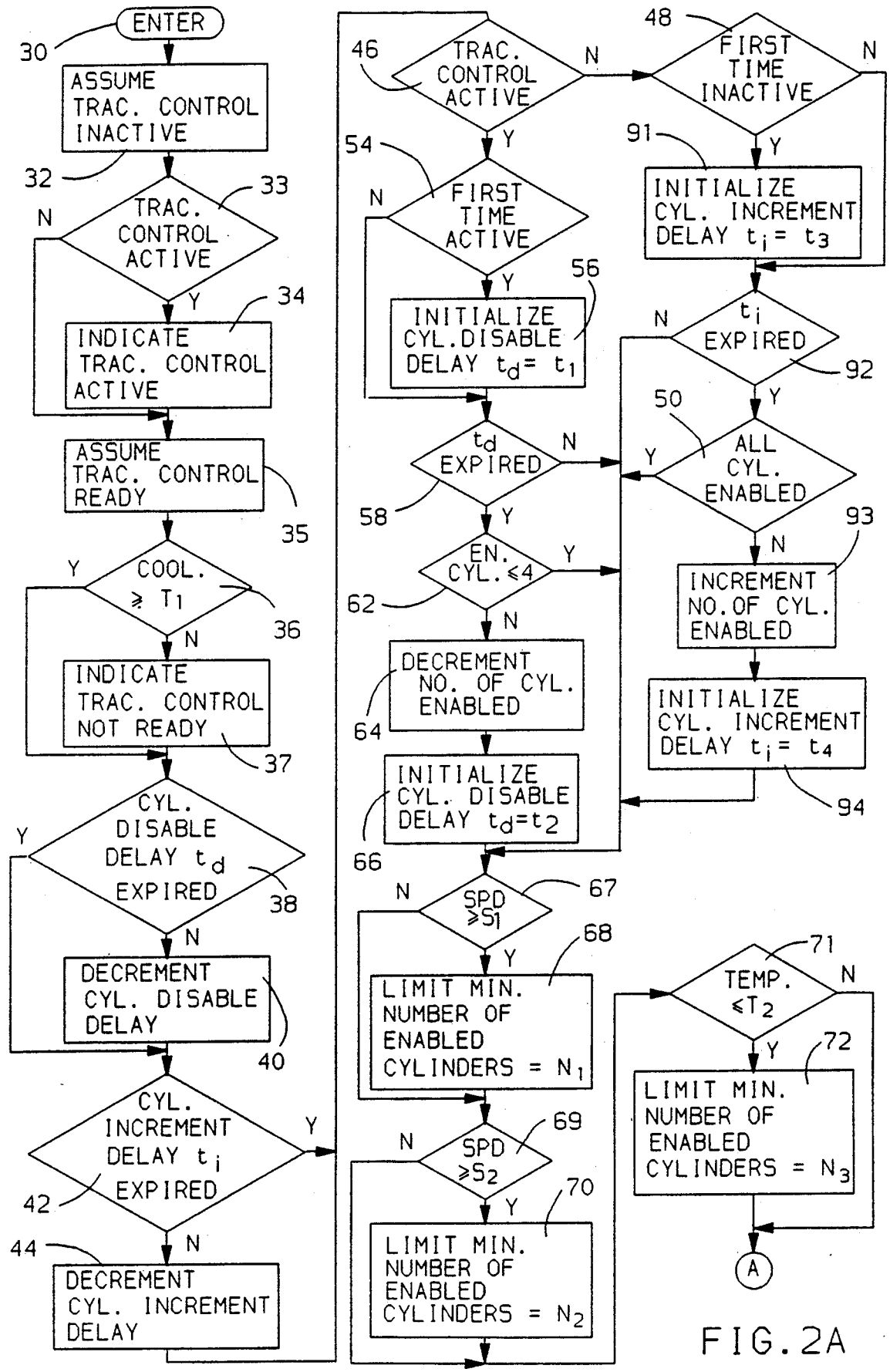
FIGS. 2A and 2B are flow diagrams illustrating the operation of the computer in FIG. 1 in controlling the engine for traction control in accord with the principles of this invention.
Figure 2B:
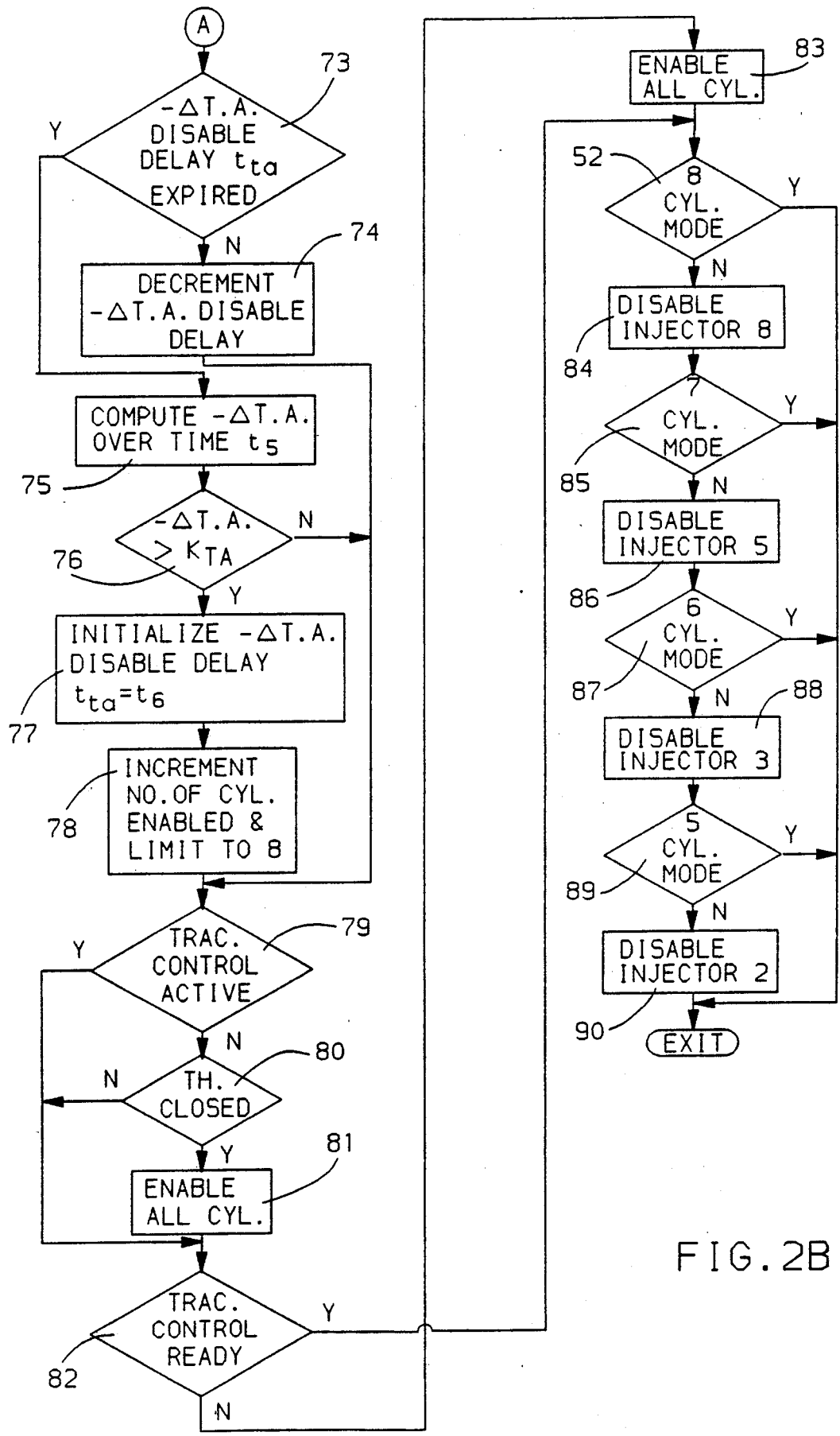

Referring to FIGS. 2A and 2B, there is illustrated the routine for selectively enabling and disabling cylinders of the engine 10 for traction control. This routine is executed repeatedly at a selected interval such as 100 milliseconds. The ROM in the digital controller 18 contains the instructions necessary to implement the algorithm diagrammed in FIG. 2. It should be noted that in describing the functions of the algorithm encoded in the ROM, references to tasks which have been detailed as flow diagram function blocks will be designated by $<nn>$, where nn is the particular flow diagram function block text being referenced. The diagrams do not represent the actual ROM instructions. It is recognized that there are a variety of known information-processing languages available to one skilled in the art to construct the actual instructions necessary to accomplish the task described by the text in the flow diagram function blocks.

The diagram of FIG. 3 illustrates the operation of the routine of FIG. 2 in controlling the torque output of the engine 10 for traction control. Whenever the traction active signal from the brake traction control computer transitions from not active to active, the number of enabled cylinders is decremented by one after an initial delay of $t_1$ such as 3 seconds. If the traction active indicator is then continuously active thereafter, additional cylinders are disabled at a rate of one every $t_2$ seconds, which may also be 3 seconds, until a minimum of four cylinders is reached or until a minimum established in accord with the principles of this invention is reached. Whenever the traction active signal transitions from active to not active, the number of enabled cylinders shall be incremented by one after an initial delay $t_3$ such as 1 second. If the traction active indicator is then continuously inactive thereafter, additional cylinders are enabled every $t_4$ seconds, which may also be 1 second, until all eight cylinders are enabled.

When the traction control routine is first entered $<30>$, it is first assumed that traction control is disabled and a traction control active flag is reset $<32>$. The system then determines whether or not traction control is active by determining the state of sampling the traction control active signal from the brake traction control computer 20 $<33>$. If the traction control signal from the brake traction control computer 20 is active (high) traction control is active and the system indicates that traction control is active by setting a traction control active flag $<34>$.

Traction control by unfueling cylinders is not allowed if the coolant temperature TEMP is less than a predetermined calibration value $T_1$. One example of the temperature value is $-40$ degrees Centigrade. This limitation provided for protection of the catalytic converter 16. This function is accomplished by assuming that traction control is ready by setting a traction control ready flag $<35>$. The flag is then reset to indicate that traction control is not ready if the coolant temperature is less than $T_1$ $<36,37>$.

The program then decrements a cylinder disable delay $t_d$ if the delay has not yet expired $<38,40>$. This delay period is the time $t_1$ or $t_2$ of FIG. 4 and as previously described is the time delay imposed before disabling the first or subsequent cylinders.

The computer next decrements a cylinder increment delay $t_i$ if the delay has not yet expired $<42,44>$. This delay period is the time $t_3$ or $t_4$ of FIG. 4 and as previously described is the time delay imposed before enabling the first or subsequent cylinders.

Assuming initially that the traction control is not active $<46>$ and was not active when the traction control routine of FIG. 2 was last executed $<48>$, that all cylinders are being fueled and therefore enabled $<50>$ and the engine is in an 8-cylinder mode $<52>$ which is the case when all cylinders are enabled, the program exits the routine (the intermediate steps having no effect when in an 8 cylinder mode as will become apparent). This is the normal operation of the routine during normal unrestricted engine operation.

All of the foregoing steps will be repeated until such time that the traction control active signal is provided by the brake traction control computer 20 indicating an excessive acceleration spin condition exists at which time the traction control active flag is set <34>. This condition is then sensed <46> and the program proceeds to disable the engine 10 cylinders one-by-one subject to the time criteria previously described until a maximum of four cylinders are disabled or a lesser number based on vehicle and engine operating parameters or until the traction control active signal is terminated. Assuming traction control was not active during the prior execution of the routine and is now active <54> the cylinder disable delay $t_d$ is set to the initial delay value $t_1$ illustrated in FIG. 3 <56>. Since just set, the program senses that the time period $t_d$ has not been fully decremented at step 40 <58>, the engine remains in an 8-cylinder mode and the program exits the routine <52> (the intermediate steps to be described having no effect in an 8-cylinder operating mode of the engine). Until expiration of the initial delay $t_1$, the foregoing steps are repeated and the engine remains in the 8-cylinder mode.

When the initial delay period $t_1$ has been fully decremented <38,40>, the program checks to determine if the number of fueled cylinders has been decreased to the absolute minimum allowable (four in this embodiment) <62>. If not, the number of fueled cylinders is decreased by one <64> and the cylinder decrement delay $t_d$ is set to the time $t_2$ illustrated in FIG. 3 <66>. As previously described, this is the delay imposed between reductions in the number of enabled cylinders after the initial delay $t_1$.

According to this invention, a minimum number of cylinders that must remain enabled through operation of the forgoing steps is established during each execution of the routine of FIG. 2 based on the most recent engine and vehicle operating conditions. The minimum number is preestablished based on those conditions so as to optimize traction control and vehicle performance as well as provide protection for the catalytic converter 16.

First, for purposes of traction control performance, the minimum number is established based on vehicle speed. If the vehicle speed is greater than a calibration value $S_1$, the number of enabled cylinders resulting from step 64 is limited to a minimum number $N_1$ <67,68>. In one embodiment, $S_1$ may be 10 MPH and $N_1$ may be 5 cylinders for an 8 cylinder engine. If the vehicle speed is less than a higher speed value $S_2$, the number of enabled cylinders resulting from step 64 is limited to a minimum number $N_2$ <69,70>. In one embodiment, $S_2$ may by 20 MPH and $N_2$ may be 6 cylinders.

Next, the minimum number of enabled cylinders is established based on coolant temperature. This is to provide protection for the catalytic converter from backfires that may occur if the number of enabled cylinders were reduced unconstrained. If the coolant temperature is less than or equal to $T_2$, the number of enabled cylinders resulting from step 64 is limited to a minimum number $N_3$ <71,72>. In one embodiment, $T_2$ may be $-5$ degrees Centigrade and $N_3$ may be 6 cylinders.

The number of enabled cylinders resulting from the foregoing steps is incremented if the vehicle operator reduces the angle of the throttle regulating engine air flow by a predetermined amount $K_{TA}$ over the most recent $t_5$ second time interval $t_5$. However, this increase in the enabled cylinders is only permitted if at least a time $t_{ta}$ has expired since the enabled cylinders were incremented by this function. In other words, if the time period since the enabled cylinders was last incremented based on the closing rate of the throttle is greater than $t_{ta}$, the rate of closure of the throttle is determined based on the change in the last $t_5$ seconds and the number of enabled cylinders increased by one if the change exceeds a calibrated value.

Procedurally, if the minimum period $t_{ta}$ has not expired <73>, the delay is decremented <74> and the remainder of the routine relating to this feature is bypassed. When the delay period has expired, the decrease in throttle angle as measured over the most recent period of $t_5$ seconds is computed <75>. If the decrease exceeds a calibrated amount $K_{TA}$ <76> representing the condition for enabling one more cylinder, the delay interval $T_{ta}$ is reinitialized to a calibration value $t_6$ <77> after which the number of enabled cylinders is incremented but limited to eight <78>. The determination of the negative rate of change in throttle angle is then inhibited until the period $t_6$ has expired. If the decrease in throttle angle over the period $t_5$ does not exceed $K_{TA}$ <76>, $t_{ta}$ is not initialized and the negative change in throttle angle over the period $t_5$ seconds is computed at each execution of the routine of FIG. 2 and the number of enabled cylinders incremented whenever the computed rate of change exceeds $K_{TA}$. In one embodiment, $t_6$ may equal 3 seconds and $t_5$ may equal 200 ms.

If the traction control is not active indicating an excessive acceleration spin condition does not exist <79> and the throttle is closed <80>, the number of enabled cylinders is immediately set to eight <81>. In addition, all eight cylinders are enabled if the traction control is not ready which, as will be recalled, is based on the coolant temperature being below $T_1$ <82,83>.

Thereafter, the cylinders of the engine are disabled by disabling the fuel injectors according to the number of cylinders enabled via the foregoing steps. The cylinders are disabled by zeroing out the fuel command at the output port of the I/O to the respective fuel injectors. If all the cylinders are enabled representing an eight cylinder mode <52>, the routine is exited and all eight cylinders are fueled. If not in an eight cylinder mode indicating a requirement to disable at least one cylinder <52>, the fuel to the injector for cylinder number 8 is disabled <84> by setting a zero pulsewidth at the I/O output port to the injector for that cylinder. Assuming that the initial delay $t_1$ had just expired so that the number of cylinders has been decremented only once, the system is in a 7-cylinder mode <72> and the program exits the routine.

As long as the traction control remains active <46>, additional cylinders are disabled one at a time at intervals of $t_2$ seconds to a low limit of 4 cylinders <58,62,64,66> or to a low limit based on vehicle and engine conditions as described above. When the number of cylinders enabled is 6 or less <85>, the injector for cylinder number 5 is additionally disabled <86>. If the number of cylinders enabled is 5 or less <87>, the injector for cylinder number 3 is additionally disabled <88>. If the number of cylinders enabled is 4 <89>, the injector for cylinder number 2 is additionally disabled <90>. When the number of cylinders corresponding to the mode established through steps 46 and 54-83 have been disabled by unfueling, the program exits the routine.

When the traction control active signal is terminated by the brake traction control computer indicating recovery from the excessive spin condition, the number of fueled cylinders is then incremented after the initial delay t3 and thereafter at intervals of t4 until all eight cylinders are again fueled.

When the traction control signal is terminated, the routine determines that traction control is inactive <3-2-34>. This condition is then sensed <46> and the program proceeds to enable the engine cylinders one-by-one subject to the time criteria previously described until all eight cylinders are enabled or until the traction control active signal is again generated. If traction control was active during the prior execution of the routine and is now inactive <48>, the cylinder increment delay $t_i$ is set to the initial delay value $t_3$ illustrated in FIG. 3 <91>. This time is decremented with each execution of the traction control routine <42,44> and while unexpired <92> the low limit of the number of cylinders is established <67-83> and the injectors disabled in accord with the number of cylinders enabled <52,84-90>.

When the initial delay period $t_3$ has been fully decremented to zero <42,44>, the program checks to determine if the number of fueled cylinders has been incremented to eight <50>. If not, the number of fueled cylinders enabled is increased by one <93> and the cylinder increment delay $t_i$ is set to the time $t_4$ illustrated in FIG. 3 <94>. Thereafter, the cylinders according to the operating mode established through steps 46-50, 67-83 and 91-94 are disabled as previously described <52,84-90>. The foregoing steps are repeated until all cylinders have again been enabled thereby establishing an 8-cylinder mode so that the routine is exited leaving all injectors enabled <52>.

The foregoing description of a preferred embodiment of the invention for purposes of illustrating the invention is not to be considered as limiting or restricting the invention since may modifications may be made by the exercise of skill in the art without departing from the scope of the invention.

We claim:

1. A method of traction control for a vehicle having wheels driven by an engine having fuel injectors for delivering fuel to the engine and a throttle for regulating air flow into the engine, the method comprising the steps of:
   sensing an excessive acceleration spin condition of the wheels;
   determining a number of fuel injectors to be disabled to reduce engine torque output to the driven wheels as a predetermined function of a sensed excessive acceleration spin condition;
   limiting the determined number of fuel injectors to a maximum number that is a function of the value of a predetermined vehicle operating parameter; and
   disabling injection of fuel from the limited determined number of fuel injectors to reduce engine torque output to the driven wheels when an excessive acceleration spin condition is sensed.

2. The method of claim 1 further including the step of measuring the value of vehicle speed and wherein (A) the predetermined vehicle operating parameter is vehicle speed and (B) the steps of limiting the determined number of fuel injectors limits the determined number at a predetermined number when the vehicle speed is less than a predetermined value.

3. The method of claim 1 further including the step of measuring engine coolant temperature and wherein (A) the predetermined vehicle operating parameter is coolant temperature and (B) the step of limiting the determined number of fuel injectors includes the step of limiting the determined number of fuel injectors at a predetermined number when the coolant temperature is below a predetermined value.

4. The method of claim 1 further including the step of measuring rate of decrease in throttle angle and wherein (A) the predetermined vehicle operating parameter is rate of decrease in throttle angle and (B) the step of limiting the determined number of fuel injectors includes the step of decrementing the selected number of fuel injectors when the rate of decrease in throttle angle exceeds a predetermined value.

* * * * *